United States Patent [19]

Levy et al.

[11] Patent Number: 4,796,122

[45] Date of Patent: Jan. 3, 1989

[54] INTEGRAL HEAD POSITIONER FOR HARD DISK STORAGE SYSTEM

[75] Inventors: Lloyd Levy, Northridge; Dan L. Kilmer, Reseda, both of Calif.

[73] Assignee: Micropolis Corporation, Chatsworth, Calif.

[21] Appl. No.: 113,614

[22] Filed: Oct. 26, 1987

Related U.S. Application Data

[63] Continuation-in-part of Ser. No. 944,466, Dec. 19, 1986, Pat. No. 4,754,353.

[51] Int. Cl.$^4$ .................. G11B 5/55; G11B 17/02; G11B 21/08
[52] U.S. Cl. .................. 360/98.01; 360/104; 360/106
[58] Field of Search .................. 360/106, 104, 98; 29/603

[56] References Cited

U.S. PATENT DOCUMENTS

| | | | |
|---|---|---|---|
| 3,864,750 | 2/1975 | Applequist | 360/98 |
| 4,331,991 | 5/1982 | Morehouse et al. | 360/106 |
| 4,391,035 | 7/1983 | Van de Bult | 29/603 |

Primary Examiner—Robert S. Tupper
Attorney, Agent, or Firm—Poms, Smith, Lande & Rose

[57] ABSTRACT

The head positioner for a Winchester type hard disk drive digital storage system includes a main rotating metal body portion having outwardly extending, integral, head positioning arms. The magnetic heads for reading and writing information on the hard disks are mounted on springly members which are referred to as "load beams". In order to reduce vibration, and to increase the accuracy of positioning of the heads on the disks, the outwardly extending arms from the main metallic body of the head positioner unit extend outwardly from the central axis of rotation for a distance which is substantially greater than the additional outward extent of the springy load beams upon which the magnetic heads are supported. Preferably the outward extent of the rigid arms is in the order of twice the length of the springy load beams. In addition, the bearings for supporting the rotating head positioning assembly are preferably mounted directly to the metallic body of the head positioner assembly. The springy load beams which support the magnetic heads may be secured to the ends of the outwardly extending arms by metal plates having tublets which may extend through holes in the springy load beams, and which are swaged into openings at the ends of the integral rigid arms. The plates may also be spot-welded to the inner ends of the springy load beams which support the magnetic heads.

17 Claims, 4 Drawing Sheets

INTEGRAL HEAD POSITIONER FOR HARD DISK STORAGE SYSTEM

RELATED PATENT APPLICATION

This patent application is a continuation-in-part of U.S. patent application Ser. No. 944,466, filed Dec. 19, 1986, now U.S. Pat. No. 4,754,353.

BACKGROUND OF THE INVENTION

In the field of storage systems using hard magnetic disks, also known as Winchester drives, the density of storage of data on the disks has reached a relatively high level. Thus, for example, in the field of 5¼ inch diameter disk drives, each disk may have somewhat more than one thousand tracks, and each track may contain more than 20,000 bytes of information, with each byte including 8 binary digits or bits of information. Thus, each side of a 5¼ inch hard disk is capable of carrying in the order of one million bits of information; and the density of storage of information will no doubt increase, as it has in the past.

With this very high density of data storage, it is important that the magnetic heads by which information is written on the disks and is read therefrom, be very accurately positioned, and that the heads are not subject to significant vibration or undesired shifting in their position as a result of mechanical linkages, or thermal or mechanical cycling. Up to the present time, head positioners have usually been formed with a central rotating member, and with a plurality of rigid mounting arms being mechanically secured to the central head positioning member by screws or the like, as shown in U.S. Pat. No. 4,544,972, for example. The magnetic heads for reading and writing information on the hard disks, are then secured to the outwardly extending arms, by springy load beams, having sufficient resilience so that as the disks rotate at high speed, the magnetic heads "fly" at a height of a few millionths of an inch over the disk surface. However, the separate mechanical linkage between the spring load beams which support the head, and the central head positioner body, introduces the possiblility of vibration and loosening, as well as distortion due to differences in thermal expansion of the materials which are typically employed, so that the accuracy of positioning of the heads is severely limited.

Accordingly, a principal object of the present invention is to provide an improved magnetic head mounting arrangement with greater accuracy and consistency in the positioning of the magnetic heads, despite vibration, thermal cycling, and the like.

SUMMARY OF THE INVENTION

In accordance with the present invention, the foregoing object is achieved through the use of a main rotatable head positioning metal body having integral outwardly extending arms which connect directly to the springy load beams which support the magnetic heads, with the outward extent of the integral arms being substantially greater than the length of the springy load beams.

In accordance with another feature of the invention, the outer ends of the integral arms from the main head positioner body are provided with holes, as are the inner ends of the spring load beams, and a small plate with an outwardly extending tublet is welded to the spring load beams with the tublet extending through the opening in the load beam, and the tublet is swaged into place within the hole at the outer end of each arm. Normally, two spring load beams are secured to each arm, with one being located on each side of each arm, and a multiple of as many as nine arms may be employed to mount heads to cooperate with both sides of eight hard disks.

In accordance with an additional aspect of the invention, a central fixed shaft assembly may be rigidly secured to the housing of the hard disk drive, and the main metallic body of the rotating head positioner may have a central opening directly engaging bearings which are mounted on the fixed central shaft or shaft assembly, to minimize the possibility of vibration or thermal factors shifting the position of the heads relative to the storage disks which are separately mounted from the hard disk drive housing.

With the main rotatable head positioning metal body directly engaging the mounting bearings, and having integral arms extending outwardly to directly and firmly support the spring load beams carrying the magnetic heads, the magnetic heads are much more accurately positioned, and are free from vibration and other adverse factors affecting head position, which could result from prior, less solid, non-integral constructions.

Other objects, features, and advantages of the invention will become apparent from a consideration of the following detailed description and from the accompanying drawings.

DETAILED DESCRIPTION

Figure 1:
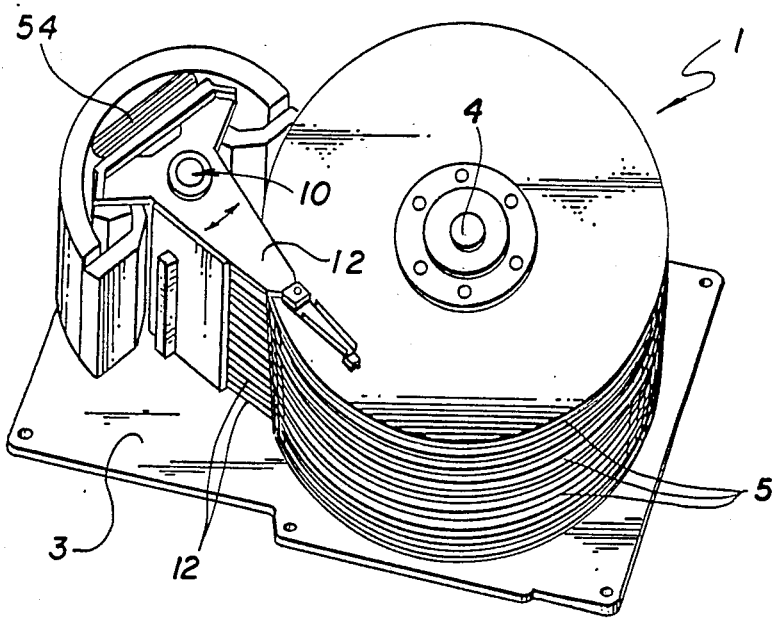
FIG. 1 is a perspective view of a Winchester or hard disk drive with the upper cover removed.
Figure 3:
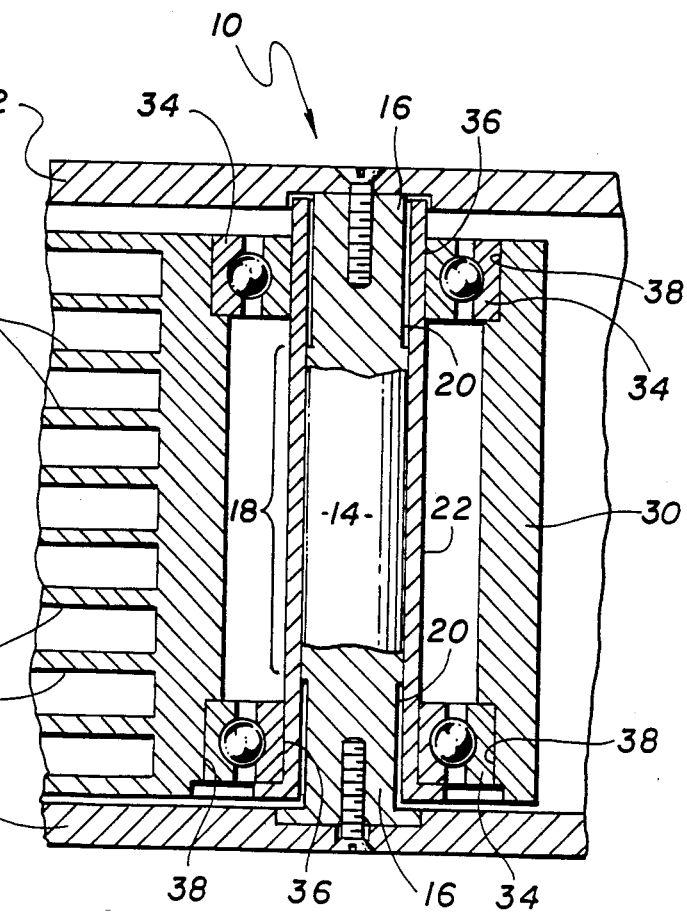
FIG. 3 is a more detailed cross-sectional view of the central hub of the head positioner of FIG. 2.
Figure 2:
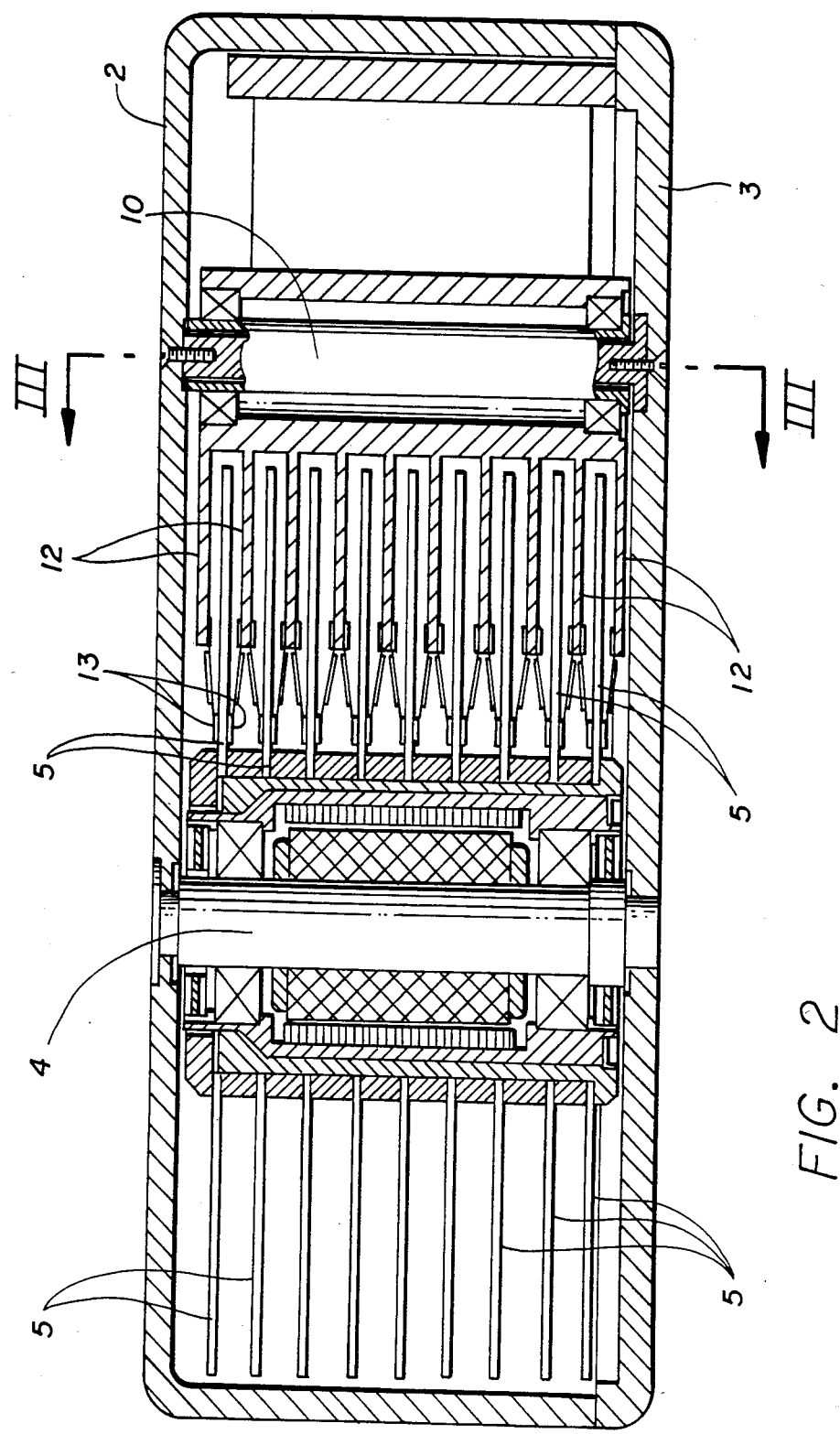
FIG. 2 is a schematic cross-sectional view of the hard disk drive of FIG. 1 with the cover assembled.

As mentioned above, this patent application is a continuation-in-part of U.S. patent application Ser. No. 944,466, filed Dec. 19, 1986. FIGS. 1 through 3 of the drawings of the present patent application, and the associated detailed description of these three figures of the drawings, correspond substantially to the drawings and related description as set forth in the prior-filed patent application. FIGS. 4 through 7, however, and the related description which appears below, are new.

Referring now to the drawings, FIG. 1 illustrates the disk drive unit 1 of a type in keeping with the subject of this invention. Disk drive 1 typically comprises a rigid, cast housing 2 (FIG. 3) and a base plate 3, the illustration of FIG. 1 having the housing 2 removed from FIG. 1 to reveal the unit's contents.

The contents of the unit typically comprise a memory disk unit 4 operating in cooperation with a magnetic head positioning assembly 10.

Memory disk assembly 4 comprises a pluality of rigid storage disks 5 having magnetizable surfaces and which are stacked coaxially in a tandem, spaced relationship and rotated about a common axis by means of a central electric motor, including a central stator; and, relative to head positioner assembly 10, having a plurality of movable, interleaved head positioning arms 12, each having one or more magnetic heads 13 mounted thereon for reading and writing information magnetically on disks 5 as arms 12 are rotated interleaving into and out of disk storage unit 4 (see FIG. 2).

A feedback control loop or servo loop includes the arm positioner 10, and one surface of one of hard disks 5 which is dedicated to head-tracking and positional control. A common problem encountered in prior art drives is the mechanical resonances that occur within the servo loop which limit ultimate performance of the drive in terms of the time required to access information on disks 5, since the resonances have to be compensated for by a reduction of servo bandwidth.

One area that can cause resonance is associated with the stiffness of the bearings on which the head positioner assembly 10 pivots. Radial stiffness of these bearings is sensitive to the amount of axial load with which the assembly is preloaded. Various operational requirements impose a need to bond both inner and outer bearings races to the shaft and housing, respectively, to maintain preloads under shock, vibration and thermal loading. the amount of axial preload typically used is about 5 lbs., which is obtained with only 300 to 500 microinches of axial deflection.

Since the total deflection is so small, loads applied to the shaft during assembly or operation can cause the bearing to become partially unloaded. This condition will cause undesirable resonances to occur as a result of reduced radial stiffness.

It has been determined that a two-piece shaft can reduce the amount of deflection seen at the bearing races by providing an inner member which can deflect in response to external loads created by various mounting tolerance conditions, but which can transmit only part of these deflections to the outer sleeve which carries the bearings. Transmitted deflection is thus reduced by using only part of the inner shaft to hold the outer sleeve in place.

An arm positioner assembly 10 is shown in cross-sectional detail in FIG. 3. Arm positioner 10 includes a central assembly which includes a cylindrical aluminum shaft 14 having a length generally coextensive with the stack of disks 5, a long axis generally parallel to the hard disk common axis, a pair of ends 16, at least one of which is fixed against rotation, a central portion 18 of a given diameter, and a pair of end portions 20 which are reduced in diameter relative to central portion 18.

An aluminum (or other metallic material such as stainless steel) mounting sleeve 22 having a length generally coextensive with shaft 14 is thermally shrink fitted coaxially about shaft 14 along central portion 18 such that a diametral clearance exists between an inner diameter of mounting sleeve 22 and shaft end portions 20. In the exemplary preferred embodiment illustrated, which is directed to Winchester-type hard disk drives, shaft 14 and sleeve 22 have a length of about 2.4" overall, central portion 18 of shaft 14 has a length of about 1.2", and end portions 20 have lengths of about 0.60" each. Central portion 18 of shaft 14 has an outer diameter of about 0.3760" and sleeve 22 is dimensioned such that there is a nominal diametral interference of about 0.0006" at room temperature between the two parts. End portions 20 are reduced in diameter relative to central portion 18 to provide a nominal diametral clearance between end portions 20 and the inner diameter of mounting sleeve 22 of about 0.006" at room temperature. Thus, the interference between the shaft central portion 18 and the sleeve 22, and the clearance between the shaft end portions 20 and the sleeve 20, are a function of shaft length, shaft and sleeve diameter, shaft end portion fabrication, and shrink fitting of the sleeve 22 around the shaft 14. Sleeve 22 is normally assembled over shaft 14 by heating sleeve 22 and/or cooling shaft 14 to provide a minimum temperature difference between the two parts of about 300–350 degrees F. immediately prior to assembly, so that a clearance between the shaft 14 and sleeve 22 arises, facilitating their assembly.

Arm positioner assembly 10 further includes a hollow aluminum cylinder having an internal cylindrical surface and an outer cylindrical surface from which extend the substantially planar head-positioning arms 12. A "voice coil" 54 is associated with the magnetic head positioning assembly and operates in conjunction with fixed permanent magnets (see FIG. 4) through the agent of a variable direct current applied to the coil to permit the rotational position of head positioning assembly 30 to be controlled by means of the feedback control loop. In order to mount the head and arm-positioning cylinder or assembly 30 for rotational movement about the stator, a pair of annular, steel ballbearing assemblies 34 are provided at opposite ends of mounting sleeve 22 and the inner diameter of arm-positioning cylinder 30. Bearing assemblies 34 are bonded in place at their inner diameters in a region 36 inclusive of end portions 20 of shaft 14 and exclusive of the central portion 18 of shaft 14 typically (although other compounds may be used) by means of a single-component, anaerobic adhesive known as Loctite TM, which is also used to bond the outer cylindrical surface of bearings 34 to an inner cylindrical surface 38 of arm-positioning cylinder 30.

Figure 4:
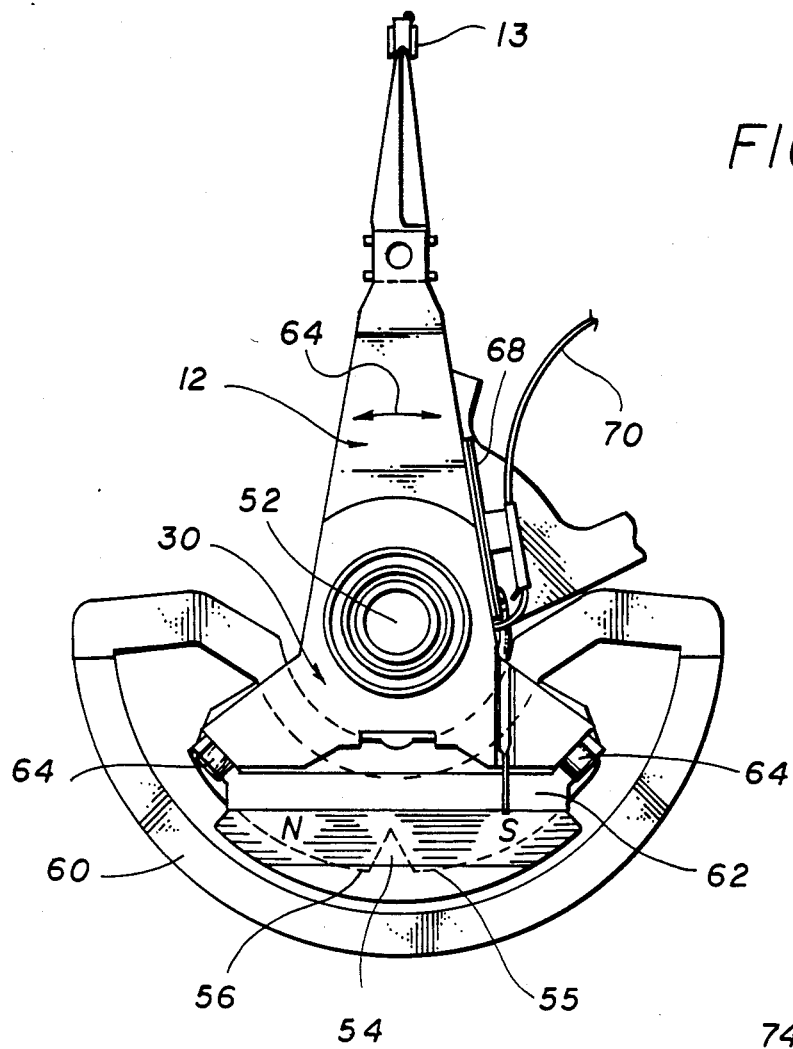
FIG. 4 is a top view of a head positioner assembly illustrating the principles of the present invention.

Referring to FIG. 4 of the drawings, the central axis of rotation of the main body 30 of the head positioning assembly 10 is indicated at reference numeral 52. Reference numeral 52 corresponds to the center of the shaft 14, as shown in FIG. 3 of the drawings.

The arrangements for rotating the head positioner assembly include the coil 54 and the magnetic assembly, including the permanent magnets 56 and 58, which, with the magnetic return path 60, provide a complete magnetic circuit. The coil 54 is mounted on a plastic and metal frame 62 which is secured to the rotating body 30 of the head positioner by screws 64. When direct current of one polarity is passed through the coil 54, it will rotate the head positioner assembly 30 as indicated by the arrows 64; and when the direct current flowing through the coil 54 is reversed, the head positioner will tend to move in the opposite direction. The foregoing mode of operation is, as broadly stated above, known in the field.

Signals from the magnetic heads 13 are connected to a small preamplifier circuit board 68, and the resultant amplified signals are coupled over a flat multicircuit cable 70 to the Winchester disk drive electronics.

Figure 5:
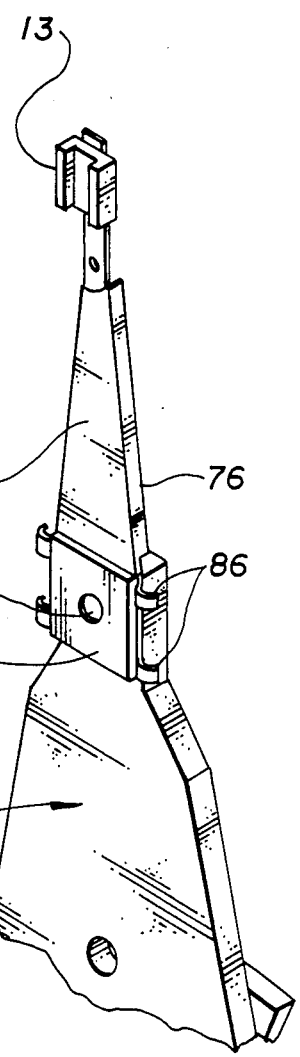
FIG. 5 is a perspective view of the outer end of one of the integral arms, together with one spring load beam mounting for a magnetic head.
Figure 7:
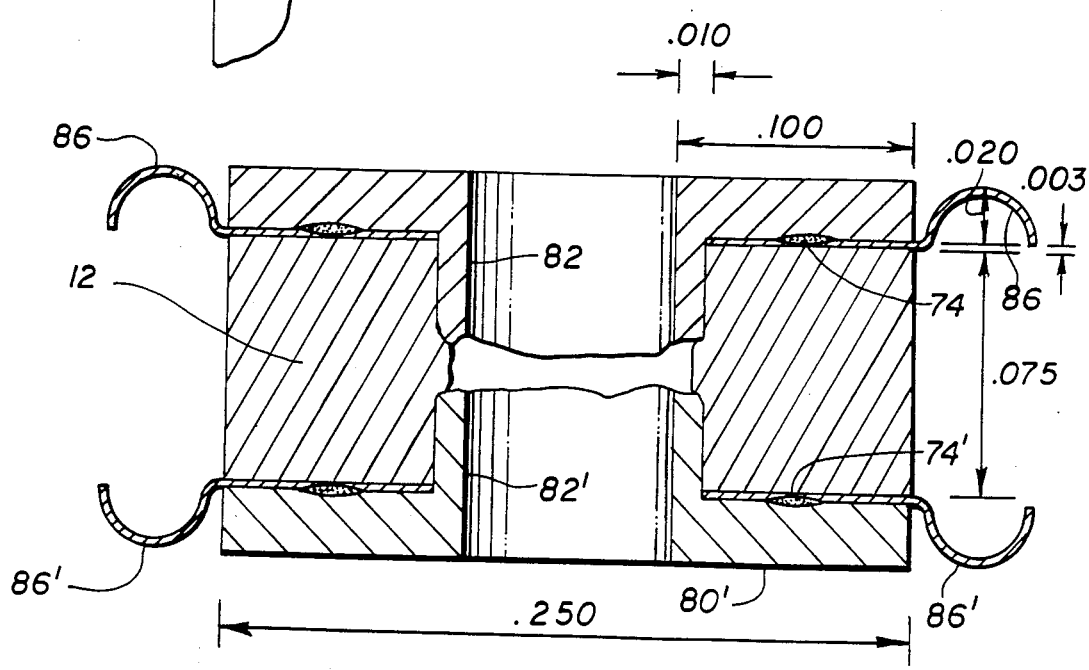
FIG. 7 is a cross-sectional view taken along lines VII—VII of FIG. 6.

The arrangements for mounting the head 13 to the outer end of the integral arm 12, are shown to advantage in FIGS. 5 and 7. More specifically, a springy flexible load beam 74, which is only about three thousandths of an inch thick, is employed for the mounting of the magnetic head 13. It may be noted that the load beam 74 has upturned edges 76 which provide increased rigidity to the load beam. The inner end of the load beam 74 and the outer end of the integral arm 12 both have matching holes, which are aligned with the opening 78 in the plate 80, which is employed to securely fasten the load beam 74 to the end of the integral arm 12. More specifically, and as shown to greater advantage in FIG. 7 of the drawings, the plate 80 may be approximately 0.020 inch thick, and may have a downwardly extending tublet 82 formed integrally therewith, and extending through the hole in the springy load beam 74.

Incidentally, the showing in FIG. 5 is that of a single magnetic head and load beam 74 secured to one of the integral arms 12, while FIG. 7 shows an arrangements wherein two load beams 74 and 74' are secured to a single integral arm 12. In addition, in FIG. 7, two plates 80 and 80' with inwardly extending tublets 82 and 82' may be shown. As noted above, the plates 80 and 80' are approximately twenty thousandths of an inch thick, while the arms 12 are approximately 0.075 inch thick. Also, as mentioned above, the load beams 74 are approximately 0.003 inch thick. As an initial step in the assembly, the plates 80 are welded to the load beams 74 by laser spot welds, or these two parts may be secured together in any other suitable manner, with the tublet 82 extending through the opening in the load beam 74. Then, all of the plates and load beams are assembled on all of the arms 12, with the tublets extending into the openings at the end of the arms 12, and the arms 12 are supported in a jig, to prevent permanent deflection thereof. A suitable swaging tool, such as a ball bearing, (or a hardened steel ball) is then forced through the openings in all of the assemblies, so that the tublets 82 are swaged outwardly to make permanent engagement with the arms 12. With the arms 12 being formed of aluminum, and the tublets 82 being of stainless steel, the swaging action causes a permanent fixation of the plates 80 and the associated load beams 74 to the ends of the arms 12.

Incidentally, the precise configuration of the load beams 74 is established prior to securing to the plate 80, so that, when the disks 5, as shown in FIG. 2 are at rest, there will be a slight engagement of the magnetic heads 13 with the disks. Then, when the disks start to rotate, the entrained air, and the configuration of the heads 13, will cause the heads 13 to "fly" or to be spaced slightly away from the surface of the disks, so that there is a few millionths of an inch of space between the magnetic surface, and the associated magnetic head.

Figure 6:
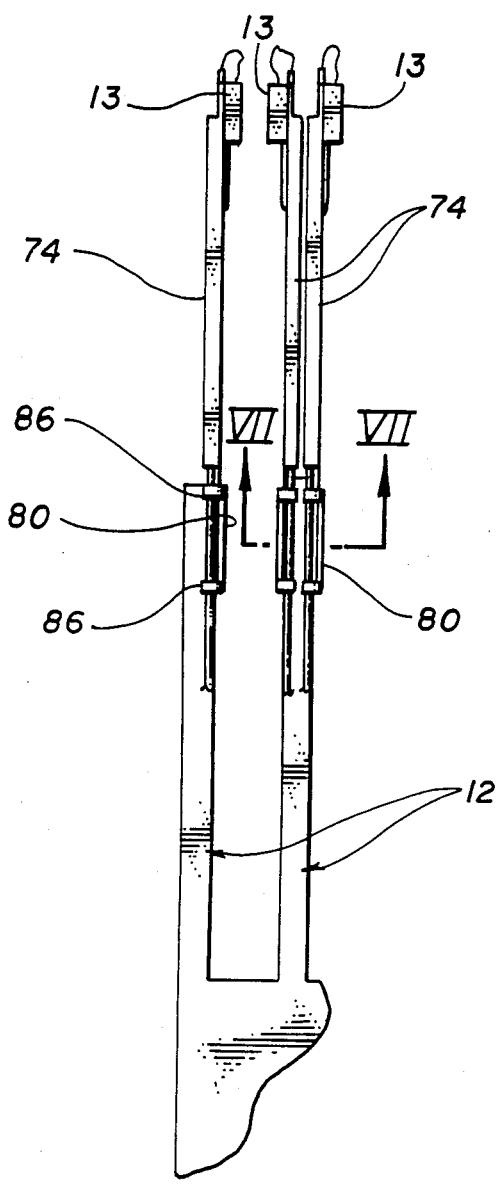
FIG. 6 is a side view of two of the arms of the head positioner, together with the associated spring load beams and associated magnetic heads.

FIG. 6 shows two of the arms 12, the associated magnetic heads 13, and three associated load beams 74. With eight disks and nine integral arms, sixteen heads and load beams are mounted with two on each intermediate arm, and one load beam and associated head on each of the end arms. Incidentally, the tabs 86 which are employed for guiding the conductors extending to the magnetic heads, are shown in FIG. 7, and at a greatly reduced scale in FIG. 6.

While precise dimensions are not critical, it is considered useful to mention the general order of the dimensions which are involved, for a 5¼ inch disk drive. More specifically, the distance from the axis 52 to the outer end of the arms 12 is approximately 2 inches, with each arm 12 having an extent from the main body of the rotating head positioner assembly 30 of about 1-¼ inches. The length of the spring load beams which support the heads is approximately one inch from the end of the integral arms 12. Accordingly, the extent of the arms 12 from the axis to their outer ends is approximately twice the length of the spring load beams supporting the heads. It is noted in passing that the integral arms are spaced fairly close together, with nine arms having a total axial extent of less than two and one-eighth inches and the space between adjacent arms being in the order of three-sixteenths of an inch. With the limited available space, it is not easy to fixedly secure sixteen spring load beams to the nine integral and fixedly spaced arms. In accordance with the present invention, however, integral arms have been employed despite the mechanical design difficulties which were encountered, and these difficulties have been overcome, with the significantly improved disk drive performance being the result.

It may also be noted that, using the system of the present invention, a disk drive having a storage capacity of approximately 382 megabytes, and a MTBF (Mean Time Before Failure) of 30,000 hours, may be achieved within the industry "form factor" dimensions of 3.25 inches in height, 5.75 inches in width and 8.00 inches in depth.

In conclusion, it is to be understood that the specific construction as shown in the drawings, and as described in detail hereinabove, is illustrative of the principles of the present invention. Various modifications could be employed, to apply the principles of the invention to smaller or larger hard disk drives, for example. In addition, the spring load beams may be rigidly secured to the other ends of the integral arms by other techniques. Thus, by way of example and not of limitation, instead of laser spot welding, the load beams may be secured to the retention plates by brazing or by suitable permanent adhesives. In addition, instead of tublet swaging, other known tehniques may be employed for permanently and rigidly securing the spring load beams to the ends of the integral arms. Further, instead of using a composite sleeve for the center mount of the assembly, as shown in FIG. 3, a single solid shaft may be employed, with alternative constructional features and arrangements for mounting the shaft to the enclosing housing, being employed instead of for those shown and described in the prior patent application cited herein. Accordingly, the present invention is not limited to the precise configuration as shown in the drawings and as described hereinabove.

What is claimed is:

1. A Winchester type digital storage system comprising:
    a plurality of hard storage disks spaced apart from one another and mounted coaxially, said disks having magnetizable surfaces;
    means for rotating said storage disks;
    a plurality of magnetic heads for reading and writing digital information on the surfaces of said disks;
    head positioning means for mounting said heads in proximity to the surfaces of said disks, and for shifting the position of said heads across said disks, said head positioning means including individual spring load beam mounting means for each head, and a main rotatable integral metal positioner body member, said integral metal positioner member having a central opening;
    bearing means engaging said central opening for rotatably mounting said positioner member about a central axia;

said positioner body member including rigid integral arms extending outwardly to support said spring mounting means, said integral arms and said body member being a single homogeneous structure free of any joints; and the outward extent of said rigid arms from said central axis being substantially greater than the length of said spring mounting means.

2. A Winchester type digital storage system as defined in claim 1 wherein the outward extent of said arms from said axis is approximately twice the length of said spring mounting means.

3. A Winchester type digital storage system as defined in claim 1 wherein said arms are approximately equal in length to the length of said spring mounting means.

4. A Winchester type digital storage system as defined in claim 1 wherein said system includes at least four disks, and at least four outwardly extending integral arms.

5. A Winchester type digital storage system as defined in claim 1 wherein said spring mounting means are in direct engagement with said rigid integral arms of said head positioner means.

6. A Winchester type digital storage system as defined in claim 1 wherein said spring mounting means are directly supported by the ends of said rigid head positioner arms.

7. A Winchester type digital storage system as defined in claim 1 further including holes in the ends of the integral arms and said spring mounting means, and metal plate means having a hollow protruding tube extending through said hole in said spring mounting means and being swaged into the hole at the end of each of said integral mounting arms.

8. A Winchester type digital storage system as defined in claim 7 wherein said spring mounting means are welded to said plates.

9. A Winchester type digital storage system as defined in claim 1 including at least six storage disks and at least six integral arms, and with a plurality of said arms extending between pairs of said disks each carrying at least two of said spring head-mounting means.

10. A Winchester type digital storage system as defined in claim 1 wherein said system includes at least eight disks and at least nine integral arms, and wherein the distance between the two outermost arms in a direction parallel to said axis is less than two and one-half inches.

11. A Winchester type digital storage system as defined in claim 1 wherein said integral arms and said spring mounting means extend outwardly substantially radially from said central axis.

12. A Winchester type digital storage system comprising:
at least four hard storage disks spaced apart from one another and mounted coaxially, said disks having magnetizable surfaces;
means for rotating said storage disks;
a plurality of magnetic heads for reading and writing digital information on the surfaces of said disks;
head positioning means for mounting said heads in proximity to the surfaces of said disks, and for shifting the position of said heads across said disks, said head positioning means including individual spring load beam mounting means for each head, and a main rotatable integral metal positioner body member;
means for mounting said positioner member to rotate about a central axis;
said positioner body member including rigid integral arms extending outwardly between said disks to support said spring mounting means, said integral arms and said member being a single homogeneous structure free of any joints; and
the outward extent of said rigid arms from said central axis being substantially greater than the length of said spring mounting means.

13. A Winchester type digital storage system as defined in claim 12 wherein said system includes at least four disks, and at least four outwardly extending integral arms.

14. A Winchester type digital storage system as defined in claim 12 wherein said spring mounting means are in direct engagement with said rigid integral arms of said head positioner means.

15. A Winchester type digital storage system as defined in claim 12 wherein said spring mounting means are directly supported by the ends of said rigid head positioner arms.

16. A Winchester type digital storage system as defined in claim 12 further including holes in the ends of the integral arms and said spring mounting means, and metal plate means having a hollow protruding tube extending through said hole in said spring mounting means and being swaged into the hole at the end of each of said integral mounting arms.

17. A Winchester type digital storage system comprising:
at least four hard storage disks spaced apart from one another and mounted coaxially, said disks having magnetizable surfaces;
means for rotating said storage disks;
a plurality of magnetic heads for reading and writing digital information on the upper and lower surfaces of each of said disks;
head positioning means for mounting said heads in proximity to the surfaces of said disks, and for shifting the position of said heads across said disks, said head positioning means including individual spring load beam mounting means for each head, and a main rotatable integral metal positioner body member, said integral metal positioner member having a central opening;
bearing means engaging said central opening for rotatably mounting said positioner member about a central axis;
said positioner body member including at least five rigid integral arms extending outwardly to directly support said spring mounting means, said integral arms and said body member being a single homogeneous structure free of any joints;
the outward extent of said rigid arms from said central axis being substantially greater than the length of said spring mounting means;
said integral arms having holes in the outer ends thereof, said spring mounting means having holes in the inner ends thereof, and metal plate means having a hollow protruding tube extending through said hole in said spring mounting means and being swaged into the hole at the end of each of said integral mounting arms; and
said spring mounting means being welded to said plates.

* * * * *